US010055570B2

(12) United States Patent
Tyson et al.

(10) Patent No.: US 10,055,570 B2
(45) Date of Patent: Aug. 21, 2018

(54) MESH RELAY

(71) Applicant: Qualcomm Technologies International, Ltd., Cambridge (GB)

(72) Inventors: Hugo Mark Tyson, Cambridge (GB); Nicolas Guy Albert Graube, Barrington (GB)

(73) Assignee: QUALCOMM TECHNOLOGIES INTERNATIONAL, LTD, San Diego, CA (US)

( * ) Notice: Subject to any disclaimer, the term of this patent is extended or adjusted under 35 U.S.C. 154(b) by 371 days.

(21) Appl. No.: 14/270,961

(22) Filed: May 6, 2014

(65) Prior Publication Data

US 2015/0245296 A1    Aug. 27, 2015

(30) Foreign Application Priority Data

Feb. 25, 2014  (GB) .................................. 1403312.0
Feb. 25, 2014  (GB) .................................. 1403314.6
Mar. 31, 2014  (GB) .................................. 1405790.5

(51) Int. Cl.
*G06F 21/44* (2013.01)
*H04L 12/26* (2006.01)
(Continued)

(52) U.S. Cl.
CPC ......... *G06F 21/44* (2013.01); *G06Q 10/0833* (2013.01); *H04B 7/14* (2013.01);
(Continued)

(58) Field of Classification Search
CPC ....... H04L 43/0817; H04L 45/34; H04Q 7/24; H04W 52/02; H04W 52/0225; G08C 17/00
See application file for complete search history.

(56) References Cited

U.S. PATENT DOCUMENTS 6,917,974 B1  7/2005  Stytz et al.
6,986,046 B1  1/2006  Tuvell et al.
(Continued)

FOREIGN PATENT DOCUMENTS

CN  102761941 A  10/2012
CN  102984798 A  3/2013
(Continued)

OTHER PUBLICATIONS

Search Report for Application No. GB1405797.0 dated Jul. 17, 2014, 4 pages.
(Continued)

*Primary Examiner* — Raj Jain
*Assistant Examiner* — Leon Andrews
(74) *Attorney, Agent, or Firm* — Paradice and Li LLP/Qualcomm

(57) ABSTRACT

A communication device capable of communicating over a network on behalf of a consumer device, the network being configured such transport of packets through the network is provided by each communication device in the network listening for and relaying packets, the communication device comprising a relay unit configured to listen for packets and relay them over the network, a mode unit configured to identify whether the consumer device is active or non-active with respect to the network, and a timing unit configured to control the time that the relay unit listens for packets in dependence on that identification.

20 Claims, 9 Drawing Sheets

(51) Int. Cl.
*H04L 12/24* (2006.01)
*H04L 9/08* (2006.01)
*H04B 7/14* (2006.01)
*H04L 12/801* (2013.01)
*H04L 12/933* (2013.01)
*H04L 29/08* (2006.01)
*G06Q 10/08* (2012.01)
*H04L 5/00* (2006.01)
*H04W 4/06* (2009.01)
*H04L 29/06* (2006.01)
*H04W 12/06* (2009.01)
*H04W 16/18* (2009.01)
*H04W 52/38* (2009.01)
*H04W 24/06* (2009.01)
*H04W 52/02* (2009.01)
*H04H 20/71* (2008.01)
*H04W 72/12* (2009.01)
*H04W 4/029* (2018.01)
*H04W 4/80* (2018.01)
*H04W 76/14* (2018.01)
*H04W 76/11* (2018.01)
*H04W 12/04* (2009.01)

(52) U.S. Cl.
CPC ........... *H04H 20/71* (2013.01); *H04L 5/0055* (2013.01); *H04L 9/0861* (2013.01); *H04L 41/082* (2013.01); *H04L 41/14* (2013.01); *H04L 43/065* (2013.01); *H04L 43/0852* (2013.01); *H04L 43/0882* (2013.01); *H04L 43/10* (2013.01); *H04L 47/115* (2013.01); *H04L 47/16* (2013.01); *H04L 49/1584* (2013.01); *H04L 63/061* (2013.01); *H04L 63/08* (2013.01); *H04L 63/0853* (2013.01); *H04L 67/30* (2013.01); *H04L 69/22* (2013.01); *H04W 4/029* (2018.02); *H04W 4/06* (2013.01); *H04W 4/80* (2018.02); *H04W 12/06* (2013.01); *H04W 16/18* (2013.01); *H04W 24/06* (2013.01); *H04W 52/0251* (2013.01); *H04W 52/38* (2013.01); *H04W 72/12* (2013.01); *H04W 76/11* (2018.02); *H04W 76/14* (2018.02); *H04W 12/04* (2013.01); *Y02A 10/46* (2018.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/22* (2018.01)

(56) References Cited

U.S. PATENT DOCUMENTS

| | | |
|---|---|---|
| 7,391,731 B1 | 6/2008 | Skelly et al. |
| 7,522,540 B1 | 4/2009 | Maufer |
| 7,778,270 B1 | 8/2010 | Zhang et al. |
| 7,787,427 B1 | 8/2010 | Simon et al. |
| 8,495,618 B1 | 7/2013 | Inbaraj et al. |
| 8,516,269 B1 | 8/2013 | Hamlet et al. |
| 8,681,671 B1 * | 3/2014 | Hui .................. H04W 52/0225 370/311 |
| 8,938,792 B2 | 1/2015 | Koeberl et al. |
| 8,953,790 B2 | 2/2015 | Qi et al. |
| 2002/0119770 A1 | 8/2002 | Twitchell, Jr. |
| 2003/0014507 A1 | 1/2003 | Bertram et al. |
| 2003/0037237 A1 | 2/2003 | Abgrall et al. |
| 2003/0163554 A1 | 8/2003 | Sendrowicz |
| 2003/0181203 A1 | 9/2003 | Cheshire |
| 2004/0001483 A1 | 1/2004 | Schmidt et al. |
| 2004/0246911 A1 | 12/2004 | Bonsma et al. |
| 2005/0036469 A1 | 2/2005 | Wentink |
| 2005/0113102 A1 | 5/2005 | Kwon et al. |
| 2005/0175184 A1 | 8/2005 | Grover et al. |
| 2005/0246533 A1 | 11/2005 | Gentry |
| 2005/0249137 A1 | 11/2005 | Todd et al. |
| 2006/0025180 A1 | 2/2006 | Rajkotia et al. |
| 2006/0034233 A1 | 2/2006 | Strutt et al. |
| 2006/0041653 A1 | 2/2006 | Aaron |
| 2006/0135064 A1 | 6/2006 | Cho et al. |
| 2006/0154598 A1 | 7/2006 | Rudland et al. |
| 2006/0156390 A1 | 7/2006 | Baugher |
| 2006/0209584 A1 | 9/2006 | Devadas et al. |
| 2006/0212938 A1 | 9/2006 | Suzuki |
| 2006/0245424 A1 * | 11/2006 | Ramanathan ........... H04L 45/34 370/389 |
| 2006/0268742 A1 | 11/2006 | Chu et al. |
| 2006/0268749 A1 | 11/2006 | Rahman et al. |
| 2007/0025274 A1 | 2/2007 | Rahman et al. |
| 2007/0097895 A1 | 5/2007 | Keshavarzian et al. |
| 2007/0105542 A1 | 5/2007 | Friedman |
| 2007/0110024 A1 | 5/2007 | Meier |
| 2007/0127421 A1 | 6/2007 | d'Amico et al. |
| 2007/0149120 A1 | 6/2007 | Money et al. |
| 2007/0206537 A1 | 9/2007 | Cam-Winget et al. |
| 2007/0211654 A1 | 9/2007 | Kim et al. |
| 2007/0211736 A1 | 9/2007 | Sapek et al. |
| 2007/0247303 A1 | 10/2007 | Payton |
| 2007/0280136 A1 | 12/2007 | Chen et al. |
| 2007/0280137 A1 | 12/2007 | Bahr et al. |
| 2007/0281721 A1 | 12/2007 | Lee et al. |
| 2008/0013947 A1 | 1/2008 | Peloso et al. |
| 2008/0069030 A1 | 3/2008 | Hirano et al. |
| 2008/0095059 A1 | 4/2008 | Chu |
| 2008/0205385 A1 | 8/2008 | Zeng et al. |
| 2008/0279155 A1 | 11/2008 | Pratt, Jr. et al. |
| 2008/0291855 A1 | 11/2008 | Bata et al. |
| 2008/0292105 A1 | 11/2008 | Wan et al. |
| 2009/0054033 A1 | 2/2009 | Pratt, Jr. et al. |
| 2009/0067373 A1 | 3/2009 | Kneckt et al. |
| 2009/0089408 A1 | 4/2009 | Bou-Diab et al. |
| 2009/0103731 A1 | 4/2009 | Sarikaya |
| 2009/0216349 A1 | 8/2009 | Kwon et al. |
| 2009/0222659 A1 | 9/2009 | Miyabayashi et al. |
| 2009/0232037 A1 | 9/2009 | Dixit et al. |
| 2009/0274173 A1 | 11/2009 | Wentink |
| 2009/0279518 A1 | 11/2009 | Falk et al. |
| 2009/0307483 A1 | 12/2009 | Falk et al. |
| 2009/0312023 A1 | 12/2009 | Kazmi |
| 2010/0005294 A1 | 1/2010 | Kostiainen et al. |
| 2010/0046439 A1 | 2/2010 | Chen et al. |
| 2010/0061272 A1 | 3/2010 | Veillette |
| 2010/0100940 A1 | 4/2010 | Reynolds |
| 2010/0141406 A1 | 6/2010 | Jo et al. |
| 2010/0149028 A1 | 6/2010 | Mermet et al. |
| 2010/0191968 A1 | 7/2010 | Patil et al. |
| 2010/0202345 A1 | 8/2010 | Jing et al. |
| 2010/0205281 A1 | 8/2010 | Porter et al. |
| 2010/0208621 A1 | 8/2010 | Morper |
| 2010/0241857 A1 | 9/2010 | Okude et al. |
| 2010/0246460 A1 | 9/2010 | Kholaif et al. |
| 2010/0260146 A1 | 10/2010 | Lu |
| 2010/0262828 A1 | 10/2010 | Brown et al. |
| 2011/0003547 A1 | 1/2011 | Oh et al. |
| 2011/0053493 A1 | 3/2011 | Yanagihara |
| 2011/0081860 A1 | 4/2011 | Brown et al. |
| 2011/0099368 A1 | 4/2011 | Koh |
| 2011/0121654 A1 | 5/2011 | Recker et al. |
| 2011/0128884 A1 | 6/2011 | Reynaud et al. |
| 2011/0149999 A1 | 6/2011 | Kamito et al. |
| 2011/0164512 A1 | 7/2011 | Citrano, III et al. |
| 2011/0216695 A1 | 9/2011 | Orth |
| 2012/0087290 A1 | 4/2012 | Rhee et al. |
| 2012/0087292 A1 | 4/2012 | Grimm et al. |
| 2012/0155397 A1 | 6/2012 | Shaffer et al. |
| 2012/0163292 A1 | 6/2012 | Kneckt et al. |
| 2012/0182860 A1 | 7/2012 | Liu et al. |
| 2012/0195231 A1 | 8/2012 | Fonseca et al. |
| 2012/0196534 A1 | 8/2012 | Kasslin et al. |
| 2012/0198434 A1 | 8/2012 | Dirstine et al. |

(56) References Cited

U.S. PATENT DOCUMENTS

| | | |
|---|---|---|
| 2012/0198435 A1 | 8/2012 | Dirstine et al. |
| 2012/0252405 A1 | 10/2012 | Lortz et al. |
| 2012/0263072 A1 | 10/2012 | Wu |
| 2013/0016654 A1 | 1/2013 | Mayo et al. |
| 2013/0029685 A1 | 1/2013 | Moshfeghi |
| 2013/0051552 A1 | 2/2013 | Handschuh et al. |
| 2013/0064175 A1 | 3/2013 | Pandey et al. |
| 2013/0065584 A1 | 3/2013 | Lyon et al. |
| 2013/0067222 A1 | 3/2013 | Munger et al. |
| 2013/0070745 A1 | 3/2013 | Nixon et al. |
| 2013/0080765 A1 | 3/2013 | Mohanty et al. |
| 2013/0107909 A1 | 5/2013 | Jones et al. |
| 2013/0128809 A1 | 5/2013 | Wentink et al. |
| 2013/0130622 A1 | 5/2013 | Yang et al. |
| 2013/0198305 A1 | 8/2013 | Veillette |
| 2013/0215900 A1 | 8/2013 | Jogadhenu |
| 2013/0219482 A1 | 8/2013 | Brandt |
| 2013/0227336 A1 | 8/2013 | Agarwal et al. |
| 2013/0242929 A1 | 9/2013 | Goergen et al. |
| 2013/0261821 A1 | 10/2013 | Lu et al. |
| 2013/0279409 A1 | 10/2013 | Dublin, III et al. |
| 2013/0279410 A1 | 10/2013 | Dublin, III et al. |
| 2013/0301471 A1 | 11/2013 | Brown et al. |
| 2013/0326614 A1 | 12/2013 | Truskovsky et al. |
| 2014/0025806 A1 | 1/2014 | Robitaille et al. |
| 2014/0044016 A1 | 2/2014 | Rahman |
| 2014/0047260 A1 | 2/2014 | Iijima |
| 2014/0064261 A1 | 3/2014 | Wang et al. |
| 2014/0089912 A1 | 3/2014 | Wang et al. |
| 2014/0108786 A1 | 4/2014 | Kreft |
| 2014/0111234 A1 | 4/2014 | Laackmann et al. |
| 2014/0112470 A1 | 4/2014 | Shen et al. |
| 2014/0167912 A1 | 6/2014 | Snyder et al. |
| 2014/0169174 A1 | 6/2014 | Gilson |
| 2014/0171062 A1 | 6/2014 | Fallgren et al. |
| 2014/0181172 A1 | 6/2014 | Elliott |
| 2014/0189790 A1 | 7/2014 | Mindler et al. |
| 2014/0266669 A1 | 9/2014 | Fadell et al. |
| 2014/0337607 A1 | 11/2014 | Peterson et al. |
| 2015/0010153 A1 | 1/2015 | Robertson |
| 2015/0019892 A1 | 1/2015 | Agrawal et al. |
| 2015/0052351 A1 | 2/2015 | Nodehi Fard Haghighi et al. |
| 2015/0058409 A1 | 2/2015 | Wang |
| 2015/0071216 A1 | 3/2015 | Ilsar et al. |
| 2015/0121108 A1 | 4/2015 | Agrawal et al. |
| 2015/0143130 A1 | 5/2015 | Ducharme et al. |
| 2015/0195692 A1 | 7/2015 | Chow et al. |
| 2015/0242614 A1 | 8/2015 | Scagnol et al. |
| 2015/0244481 A1 | 8/2015 | Tyson et al. |
| 2015/0244484 A1 | 8/2015 | Tyson et al. |
| 2015/0244623 A1 | 8/2015 | Heydon et al. |
| 2015/0244648 A1 | 8/2015 | Tyson et al. |
| 2015/0244828 A1 | 8/2015 | Heydon |
| 2015/0245179 A1 | 8/2015 | Jarvis et al. |
| 2015/0245182 A1 | 8/2015 | Scagnol et al. |
| 2015/0245203 A1 | 8/2015 | Tyson et al. |
| 2015/0245204 A1 | 8/2015 | Heydon |
| 2015/0245220 A1 | 8/2015 | Williamson et al. |
| 2015/0245231 A1 | 8/2015 | Jarvis et al. |
| 2015/0245296 A1* | 8/2015 | Tyson ............... H04L 43/0817 370/311 |
| 2015/0245351 A1 | 8/2015 | Banerjea et al. |
| 2015/0245369 A1 | 8/2015 | Heydon |
| 2015/0245412 A1 | 8/2015 | Tyson et al. |
| 2015/0326444 A1 | 11/2015 | Smith et al. |
| 2015/0351014 A1 | 12/2015 | Jung et al. |
| 2015/0351084 A1 | 12/2015 | Werb et al. |
| 2017/0149609 A1 | 5/2017 | Tofighbakhsh et al. |
| 2017/0250749 A1 | 8/2017 | Mazzarella et al. |

FOREIGN PATENT DOCUMENTS

| | | |
|---|---|---|
| EP | 1496668 A1 | 1/2005 |
| EP | 1780951 A2 | 5/2007 |
| EP | 1886450 B1 | 2/2008 |
| EP | 2306692 A1 | 5/2014 |
| GB | 2464125 A | 4/2010 |
| JP | 2007124148 A | 5/2007 |
| WO | 02078272 A1 | 10/2002 |
| WO | 03026224 A1 | 3/2003 |
| WO | 2004004230 A1 | 1/2004 |
| WO | WO-2004104850 A1 | 12/2004 |
| WO | 2007013914 A1 | 2/2007 |
| WO | 2008013878 A1 | 1/2008 |
| WO | 2008004102 A2 | 5/2008 |
| WO | 2009082151 A2 | 9/2009 |
| WO | 2009088887 A2 | 10/2009 |
| WO | 2010036885 A2 | 4/2010 |
| WO | 2010/089737 A1 | 8/2010 |
| WO | 2011043755 A1 | 4/2011 |
| WO | 2012064178 A1 | 5/2012 |
| WO | 2013010427 A1 | 1/2013 |
| WO | 2013028404 A1 | 2/2013 |
| WO | 2013057666 A1 | 4/2013 |
| WO | 2014/000163 A1 | 1/2014 |
| WO | WO-2014105893 A1 | 7/2014 |
| WO | WO-2014159131 A2 | 10/2014 |

OTHER PUBLICATIONS

Chiang et al., "Neighborhood-Aware Density Control in Wireless Sensor Networks" published in Sensor Networks, Ubiquitous and Trustworthy Computing, 2008, SUTC '08. IEEE International Conference on, Jun. 11-13, 2008, pp. 122-129, publisher IEEE, Taichung.

Balachandran et al., "Adaptive sleeping and awakening protocol (ASAP)for energy efficient adhoc sensor networks" published in Communications, 2005, ICC 2005. 2005 IEEE International Conference on, May 20, 2005, pp. 1068-1074 (vol. 2), publisher IEEE, Seoul.

Search Report for Application No. GB1403314.6 dated Jun. 20, 2014, 4 pages.

Search Report for Application No. GB1405789.7 dated Jul. 24, 2014, 4 pages.

Search Report for Application No. GB1403312.0 dated Jun. 25, 2014, 3 pages.

Search Report for Application No. GB1405786.3 dated Jul. 17, 2014, 3 pages.

Search Report for Application No. GB1405790.5 dated Jul. 22, 2014, 4 pages.

Search Report for Application No. GB1413880.4 dated Aug. 18, 2014, 7 pages.

Search Report for Application No. GB1405791.3 dated Jun. 26, 2014, 3 pages.

Search Report for Application No. GB1405785.5 dated Jul. 28, 2014, 4 pages.

Search Report for DE Application 10 2014 012 258.1 dated Mar. 2, 2015 (12 pages).

Search Report for DE Application 10 2014 012 518.1 dated Feb. 27, 2015 (14 pages).

Search Report for DE Application 10 2014 012 615.3 dated Jan. 27, 2015 (6 pages).

Search Report for GB Application 1405790.5 dated Oct. 14, 2014 (5 pages).

Search Report for GB Application 1501943.3 dated Mar. 20, 2015 (4 pages).

Search Report for GB Application 1412722.9 dated Jan. 13, 2015 (6 pages).

Search Report for GB Application 1415178.1 dated Sep. 25, 2014 (5 pages).

Search Report for GB Application 1405797.0 dated Sep. 2, 2014 (3 pages).

Search Report for GB Application 1405789.7 dated Sep. 26, 2014 (4 pages).

Search Report for GB Application 1412715.3 dated Jan. 8, 2015 (3 pages).

Search Report for GB Application 1415177.3 dated Sep. 10, 2014 (4 pages).

(56) References Cited

OTHER PUBLICATIONS

Search Report for DE Application 10 2014 012 257.3 dated Jan. 27, 2015 (7 pages).
Search Report for DE Application 10 2014 012 616.1 dated Feb. 3, 2015 (6 pages).
Schutz K: "Trusted Platforms for Homeland Security", Atmel white paper, Copyright 2004, pp. 1-8, http://www.atmel.com/images/doc5062.pdf.
Shbair W.M., et al., "A New Security Mechanism to Perform Traffic Anonymity with Dummy Traffic Synthesis", International Conference on Computational Science and Engineering 2009, CSE 2009, 29-31, Aug. 2009, Seiten, pp. 405-411.

* cited by examiner

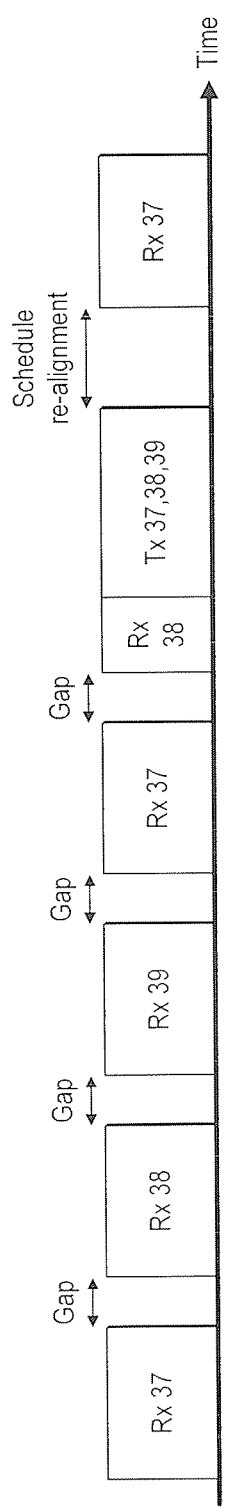
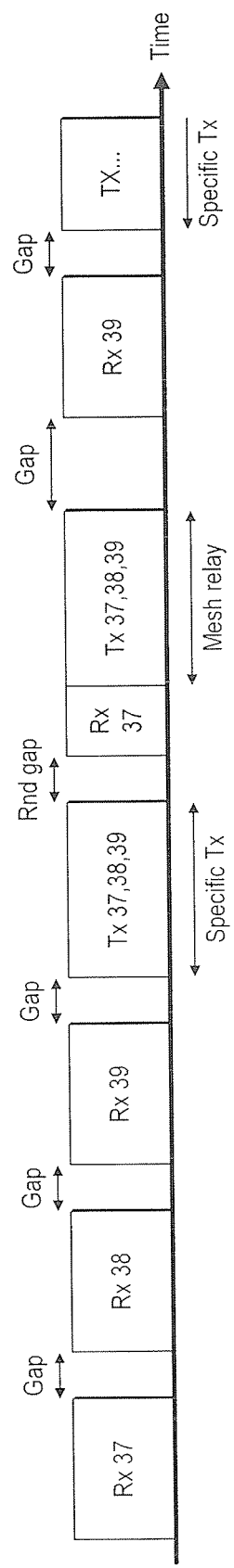
FIG. 6a
FIG. 6b

MESH RELAY

TECHNICAL FIELD

This invention relates to a communication device that is capable of relaying packets in a mesh network.

BACKGROUND

FIG. 1 shows a distributed network. The network comprises a number of communication devices 101, 103, 105 and 107. Each device can communicate wirelessly with the other devices that are in effective range of it. In this example the network is a mesh network, meaning that each device relays data for the network. The devices can communicate to propagate data between them. For example, if device 101 transmits a signal, that signal can be received by devices 103 and 107 which are within range of device 101. Devices 103 and 107 can then relay the signal received from device 101 so that it can be received by device 105, which is out of range of device 101 or was not listening when the signal from device 101 arrived. The coverage area of device 101 is illustrated at 108 and the coverage area of device 105 is illustrated at 109. This method of communication allows devices to communicate even though they are out of direct range or not synchronised with each other. Each device may also be connected to, or integrated within, an associated consumer device. So device 101 is connected to a sensor that detects whether window 102 is open or closed, and devices 103 and 105 are connected to light fittings 104 and 106 respectively.

Many mesh networks send data using complex routing tables. The routing tables store routes from one network device to another so that messages can be propagated from source to destination via a series of hops. The topology of the network has to be known in order that routes between the various devices can be determined and stored. An alternative is flood routing. In this method messages do not travel from one device to another via a predefined route. Instead messages are broadcast and any device in range that receives a message retransmits it. A message thus propagates its way through the network, potentially reaching its destination via a number of different routes. Flood routing is very simple to implement and although it may appear inefficient has a number of advantages, particularly for ad hoc networks that may change their topology on a random basis.

Flood routing implies that all devices should theoretically listen continuously for signals from other devices in the network, otherwise there is a risk that data might not reach its destination. Continuous listening increases power consumption. In current mesh networks this is often unimportant because most mesh devices have access to a mains power source, which eliminates the requirement for power saving. It does, however, limit the range of devices that can form part of the network. There is a need to open up mesh networks to a wider range of devices, including those with severe power restrictions.

SUMMARY

According to one embodiment, there is provided a communication device capable of communicating over a network on behalf of a consumer device, the network being configured such transport of packets through the network is provided by each communication device in the network listening for and relaying packets, the communication device comprising a relay unit configured to listen for packets and relay them over the network, a mode unit configured to identify whether the consumer device is active or non-active with respect to the network and a timing unit configured to control the time that the relay unit spends listening for packets in dependence on that identification.

The timing unit may be configured to control the time that the relay unit spends listening for packets by adjusting the length of a window during which the relay unit listens continuously for those packets.

The timing unit may be configured to control the amount of time that the relay unit spends listening for packets by adjusting a time interval between windows during which the relay unit listens continuously for those packets.

The timing unit may be configured to, if it is determined that the consumer device is non-active, control the relay unit to listen for less time than if it is determined that the consumer device is active.

The timing unit may be configured to control the amount of time that the relay unit listens for packets in dependence on a power status of the communication device.

The timing unit may be configured to, when the communication device is battery powered, control the amount of time that the relay unit listens for packets in dependence on an energy level remaining in the battery.

The network may be an asynchronous network, and the relay unit may be configured to listen to packets asynchronously from other communication devices in the network.

The relay unit may be configured to insert a time interval of random duration between each window during which it listens continuously.

The mode unit may be configured to identify whether the consumer device is active or non-active in dependence on information received from that consumer device.

The mode unit may be configured to identify that the consumer device is active if it is waiting to receive a packet that will cause the consumer device to adjust its behaviour.

The mode unit may be configured to identify that the consumer device is non-active if it is not waiting for a packet that will cause the consumer device to adjust its behaviour.

According to a second embodiment, there is provided a method for communicating over a network on behalf of a consumer device, the network being configured such transport of packets through the network is provided by a communication device associated with each consumer device in the network listening for and relaying packets, the method comprising identifying whether a consumer device is active or non-active with respect to the network, and controlling the time that the communication device associated with that consumer device spends listening for packets over the network in dependence on whether the consumer device is active or non-active.

According to a third embodiment, there is provided a communication network configured such transport of packets through the network is provided by each communication device in the network listening for and relaying packets, the communication network comprising a plurality of communication devices, some of which are associated with consumer devices that are active with respect to the network and some of which are associated with consumer devices that are non-active with respect to the network, transport of packets through the network being provided by the communication devices that are associated with active consumer devices listening for packets for longer than communication devices that are associated with non-active consumer devices.

The network may be configured such that a period for which a communication device associated with a non-active consumer device is not listening for packets overlaps with a window during which another communication device in the network is listening.

The network may be configured such that the plurality of communication devices cooperate to have the period during which one communication device is not listening overlap with a window during which another communication device is listening.

The network may be configured such that the plurality of communication devices operate asynchronously of each other.

The network may be configured such that the plurality of communication devices do not cooperate to have the period during which one communication device is not listening overlap with a window during which another communication device is listening.

The density of communication devices in the network may be sufficient such that, when one communication device is not listening another communication device is listening, the transport of packets through the network therefore being unaffected by communication devices that are associated with non-active consumer devices listening for less time than communication devices that are associated with active communication devices.

According to a fourth embodiment, there is provided a method for operating a communication network which is configured such transport of packets through the network is provided by each communication device in the network listening for and relaying packets, the communication network comprising a plurality of communication devices, some of which are associated with consumer devices that are active with respect to the network and some of which are associated with consumer devices that are non-active with respect to the network, and the method comprising providing transport of packets through the network by the communication devices that are associated with active consumer devices listening for packets for longer than communication devices that are associated with non-active consumer devices.

According to a fifth embodiment, there is provided a communication network configured such transport of packets through the network is provided by each communication device in the network listening for and relaying packets, the network comprising a plurality of communication devices, each of which is configured to adjust a length of time for which it listens to packets so as to save power, and the network being configured such that the plurality of devices interact to implement a stochastic packet transport in which the combination of a plurality of communication devices listening intermittently compensates for gaps in the listening of individual ones of those communication devices.

The plurality of communication devices may be configured to individually adjust the length of time for which they listen for packets.

The network may be configured such that the plurality of communication devices operate asynchronously of each other.

The network may be configured such that the plurality of communication devices cooperate to have the period during which one communication device is not listening overlap with a window during which another communication device is listening.

The network may be configured such that the plurality of communication devices do not cooperate to have the period during which one communication device is not listening overlap with a window during which another communication device is listening.

According to a sixth embodiment, there is provided a method for transporting packets through a communication network comprising a plurality of communication devices, each of which is configured to adjust a length of time for which it listens to packets so as to save power, the method comprising each communication device in the network listening for and relaying packets, and the plurality of devices interacting to implement a stochastic packet transport in which the combination of a plurality of communication devices listening intermittently compensates for gaps in the listening of individual ones of those communication devices.

BRIEF DESCRIPTION OF THE DRAWINGS

The present invention will now be described by way of example with reference to the accompanying drawings. In the drawings:

FIGS. 6a and 6b illustrate one option for acting as a relay in a Bluetooth Low Energy (BLE) mesh network;

DETAILED DESCRIPTION

Figure 1:
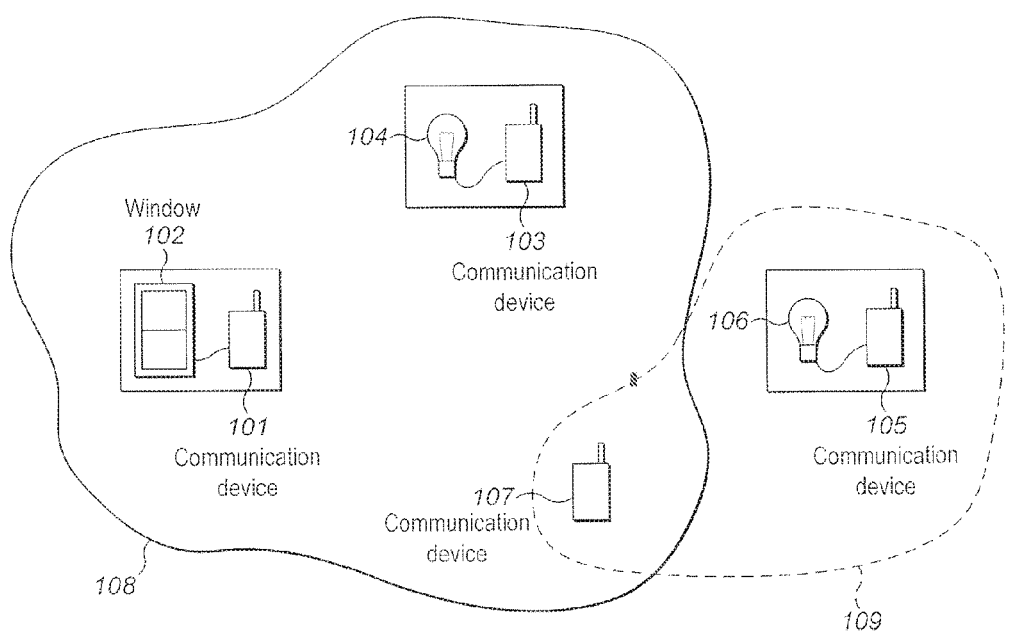
FIG. 1 illustrates a distributed network.

In a wireless network data is transmitted via radio signals. In a wired implementation, data may be transmitted via electrical signals. Most commonly data will be arranged in "packets" incorporating payload data and some indication of the source device and the destination device. Packets take many different formats and the apparatus, network and method described herein are not limited to using a particular type of packet. The term "packet" is therefore used herein to denote any signal, data or message transmitted over the network.

There are three main reasons why it may be impractical for a communication device to spend significant amount of time listening for packets. The first is the cost in power. The second is the physical impossibility for many devices of receiving at the same time as transmitting. The third is the need to perform other functions outside of the network, which may not be possible while listening for packets. The challenge in a mesh network is to reconcile these drawbacks with each node's responsibility to relay data for the network.

Some devices have a functional purpose that requires them to receive all mesh packets. These can be considered "active" devices: they are waiting for a packet that will cause them to change their behaviour. This type of packet may be termed a "command", and it is a packet that is intended for that particular device. This is opposed to packets that are intended for other devices, which the device just relays. Active devices spend significant amount of time listening for potential commands. It is not advisable to reduce this listening time, because missing packets can impact the device's ability to perform its function. Such devices are usually designed to have an inexhaustible or rechargeable power source.

An important insight is that not all mesh devices are waiting for a signal from the network that will cause them to change their behaviour. For example:
- a device might be of a type that is not sent commands by the network (although it may itself send commands or reports via the network);
- a device might be of a type that does not adapt its behaviour in response to commands from the network—it may be essentially stateless with respect to those commands;
- a device might be configured to receive commands at predetermined intervals, so that the rest of the time it is not waiting to receive anything;
- a device might be of a type that would normally expect to change its behaviour in dependence on a signal from the network but at present it has not got an assigned role within the network, so is not waiting to receive anything; or
- a device might be of a type whose primary function is entirely separate from the network, it neither sends nor receives commands, though it can usefully relay them.

A mesh network for an environment, such as the home, may be composed of three main components: sensors that monitor or gather information from the environment and send appropriate messages; actuators that receive commands and change the environment accordingly; and controllers that provide additional intelligence by combining multiple inputs together and using the combined information to issue commands that cause devices in the network to adapt their behaviour.

A sensor is an example of a device that might not be sent commands by the network at all. It might not be configured to adapt its behaviour following a command from the network either. For example, some sensors may be configured just to send status reports. An example might be a light detector configured to detect the light levels in a room at regular intervals and report back to a lighting controller.

An actuator is an example of a device that might be configured to expect commands only at predefined times. For example, a controller for a boiler might expect commands from a heating control system between certain times of day, e.g. between 6 am and 10 am and between 6 pm and 11 pm when the owners of a house will want hot water. The rest of the time it will not anticipate any commands so it will not be waiting for a signal from the network.

A controller is an example of a device that would normally expect to receive information from the network but might not currently have a defined role. For example, a home owner might configure his laptop with a mesh network connecting his home lighting system, expecting to use the laptop to control the system. The home owner might configure his smart phone to be part of the home lighting system at the same time. Finding the smart phone to be a convenient control means, the home owner may never actually configure his laptop to perform that task. So the laptop is part of the network, but does not actually have a defined role within it.

Appreciating that, while it is important for some devices to receive all packets, this is by no means true of all devices in a mesh network, leads to two further insights.

First, a "passive" (i.e. non-active) device does not need to listen continuously from its own perspective; since it is not waiting to adapt its behaviour responsive to a packet from the network, it makes no difference to the device itself if it drops a packet. The only other reason it might have to listen continuously is to relay packets for other devices. In reality, it is often simply impossible for one device to listen for packets all the time anyway. This is because many communication devices are incapable of listening at the same time as they transmit. So, packets that arrive while the device is transmitting are inevitably lost. Furthermore, being part of the mesh network may not be the only functional purpose of the device, and it may not be able to listen for packets on the mesh network while it is fulfilling that other purpose. Therefore, it is conceivable the network could still function with the device deliberately reducing its listening time still further, in order to conserve battery life.

Second, from the perspective of the network it does not matter which particular device relays a packet; it only matters that the packet is relayed. Thus it may be possible to have one relay device deliberately not listen for packets on the basis that any gaps in its listening time will be covered by other devices in the vicinity. It becomes possible to trade listening time against the number of relay devices. One device listening for N seconds can be traded against two or more devices listening for K seconds, with K<N.

One advantage of this approach is that it reduces the time for which an individual device has to listen for packets, which also reduces power consumption. This enables battery-powered relay devices to become possible, whereas previously only mains-powered relay devices could realistically be considered. This is a significant step in permitting flexible mesh deployment and ad-hoc arrangements. It also enables any device configured to operate in accordance with the mesh protocol to form part of the mesh whilst still allowing other "primary" (i.e. non-mesh) functions to be performed.

Figure 2:
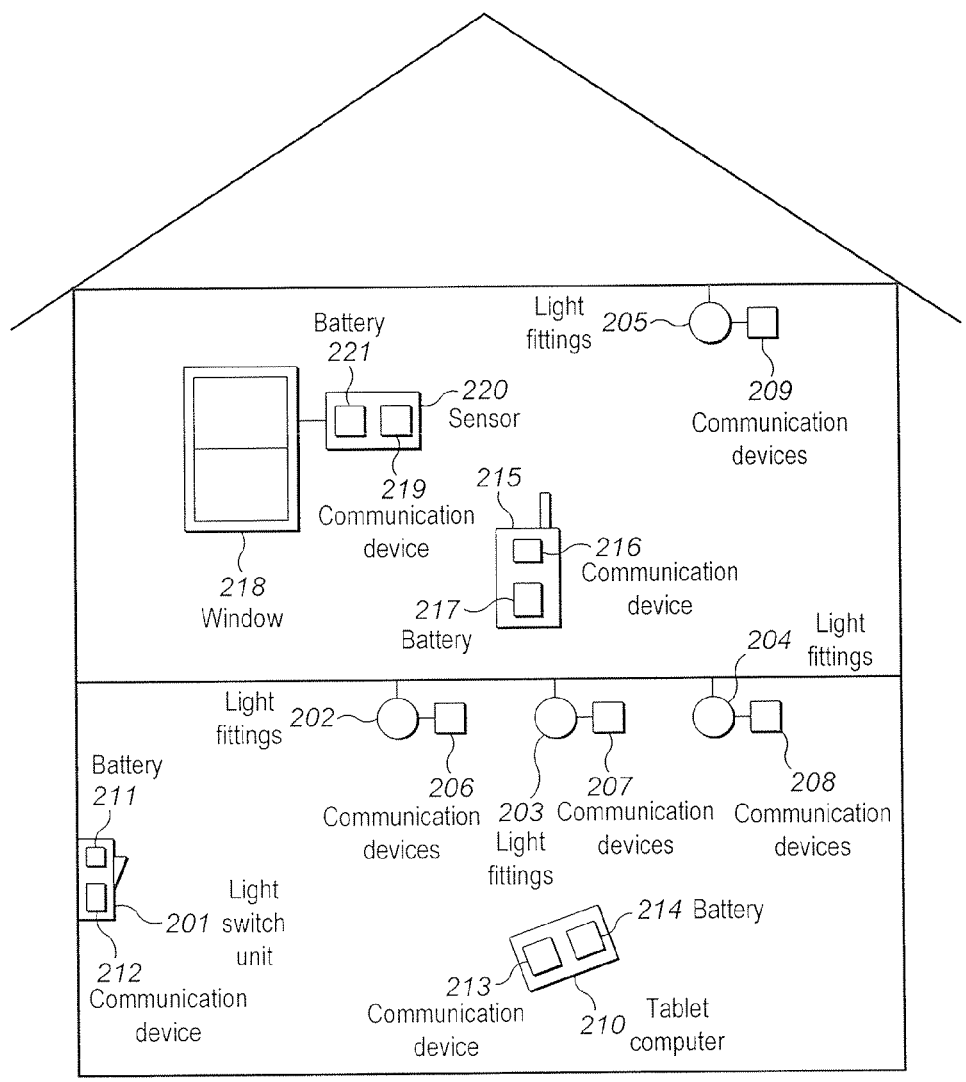
FIG. 2 illustrates a distributed lighting system installed in a house.

An example of a network is shown in FIG. 2, which represents a house having a distributed lighting system. The system comprises a light switch unit 201 and light fittings 202, 203, 204, 205. Light switch unit 201 is integrated with a wireless communication device 212. Light fittings 202 to 205 are integrated with respective wireless communication devices 206, 207, 208, 209. The house has a mains electrical supply which powers the light fittings and their respective wireless communication devices 206 to 209. Light switch unit 201 and its wireless communication device 212 are powered by a local battery 211.

The house contains other items of equipment that contain other wireless communication devices. For example, there is a tablet computer 210 which contains a wireless communication device 213, and a mobile phone 215 which contains a wireless communication device 216. There is also a sensor 220 for detecting the open/closed state of window 218, which contains communication device 219. Computer 210, phone 215 and sensor 220 are powered by batteries 214, 217 and 221 respectively.

Wireless communication devices 206 to 209, 212, 213, 216 and 219 operate according to the same wireless communication protocol. That could be a relatively short-range protocol. For example the effective range of each device could be less than 25 m. That characteristic can permit the devices to use less power for transmitting and/or receiving than would be expected in a longer range protocol. The protocol could be one that imposes no common time-base at or below the transport level, or below the application or presentation levels. In other words, the devices in the network operate asynchronously of each other. That characteristic can reduce the devices' power consumption by reducing their need for accurate clocks running continuously. In one example, the devices could operate according to the Bluetooth protocol, specifically the Bluetooth Low Energy (BLE) protocol. The devices could use other protocols, for instance IEEE 802.11.

Devices 206 to 209 are configured cooperatively in order that the light fittings 202 to 205 know to respond to signals from the light switch 201. This may be done by the devices 206 to 209 storing a common identification code in their respective non-volatile memories. The identification code may be stored in the light switch when it is manufactured, and stored in the light fittings at the time they are installed in the house. They may be stored in the light fittings by means of another device such as mobile phone 215 communicating with the wireless device of the light switch to read its identification code, and then communicating with the wireless devices of the light fittings to cause them to store that same identification code. This code may be a network key, and it may be used to sign all packets sent over the network.

The communication devices in FIG. 2 are all connected to or fully integrated with another device—a "consumer"—on behalf of which the communication device transmits and receives packets over the network. In many cases the primary function of the consumer may have nothing to do with the network. Consumer devices have varying levels of complexity. In one example a consumer device might be a tablet computer; in another it might just be a clock configured to count down to an expiry date of some perishable goods. It also possible for the communication device to be a consumer itself. An example of such a scenario might be when a communication device uses X10, which is a protocol designed to support the integration of electronic devices within the home.

A connection between the communication device and its associated consumer may be wired or wireless. The communication device may be contained within the same housing as the consumer. In many implementations the communication device might be fully integrated with the consumer; they might even share circuitry. Often the communication device will be implemented by a chip within the consumer. An example of this is communication device 216 within phone 215. In other implementations the communication device and the consumer may be separate devices that are connected together. For example, the communication device might be a Bluetooth Low Energy (BLE) tag connected to a PC.

For the purposes of this document, the communication device is considered to be the combination of hardware and/or software that implements the protocol governing the network, thereby implementing the packet transport that enables the consumer to communicate over the network.

Figure 3A:
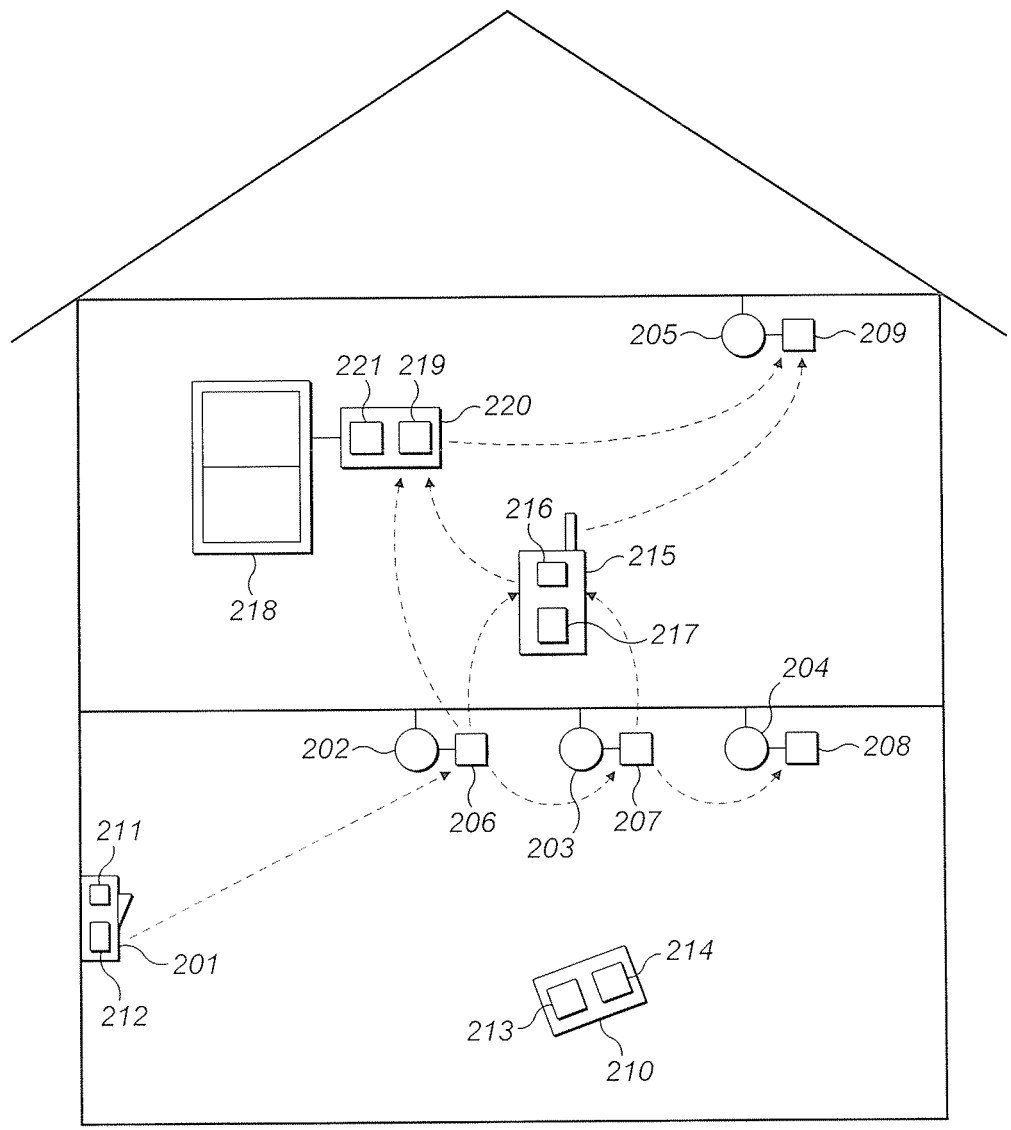
FIGS. 3a and 3b illustrate a packet propagating through the distributed lighting system.

Each communication device may be capable of acting as a relay in the network. An example of this is shown in FIG. 3a, which shows the same distributed lighting system as FIG. 2, where like reference numerals refer to like parts. The network is configured as a mesh network so, at least in theory, all devices that are part of the network have a responsibility to act as relays. A relay device suitably retransmits any packet that it recognises as having originated from the network. The relay device might also take steps to prevent old packets from being continuously bounced around the network, e.g. by only forwarding the packet if it is new and/or by decrementing a "time-to-live" value in the packet before forwarding it on. FIG. 3a shows an example of the network operating according to traditional mesh principles. Light switch 201 transmits a packet addressed to all of devices 206 to 209 instructing light fittings 202 to 205 to switch on. This packet is propagated by all devices that receive it, eventually reaching light fitting 205, which is out of range of light switch 201, the source of the packet.

The network is preferably also configured to implement flood routing, which is well suited to ad hoc networks. The phone 215 and the tablet computer 210 are both portable devices that change location within the network as a user picks them up and moves them. They may also occasionally leave the network and then reappear some time later. For example, when a user takes them out of range of the network by taking them out of the house and later returns them to the house. The network's topology is thus subject to random alteration.

The network contains some communication devices that are "active" (e.g. devices 206 to 209, which are always waiting for a command for light fittings 202 to 205 to switch on/off, change their intensity or colour, etc.). The network also contains some communication devices that are not active (e.g. device 219, which is part of a sensor 220 that is not configured to receive or respond to commands from the network). In general non-active devices have more scope for reducing their listening time than active devices, although either type of device might reduce its listening time. Typically, battery-powered devices will want to reduce power consumption, and therefore their listening time, as much as possible. One potential power saving mechanism is for the communication device to adjust the time it spends listening for packets over the network in dependence on whether it is currently associated with an active or non-active consumer.

Although the arrangement shown in FIG. 3a is effective at propagating packets to all devices in the network, constant listening is an expensive operation and should preferably be avoided in contexts where power availability is an issue. Although both device 216 and device 219 are capable as acting as relays, they are both battery powered and would prefer to reduce power consumption where possible. Devices 216 and 219 are also associated with non-active consumers (phone 215 and sensor 220 respectively). Phone 215 is not waiting for any packets from the network to alter its behaviour because although it is associated with the network and knows the network key it is not currently playing any role in the network. Sensor 220 is not waiting for any packets because it simply is not configured to alter its behaviour in response to a packet from the network. Therefore, one or both of those devices, having determined that their associated consumer is not "active", may configured to deliberately reduce their listening time.

Figure 3B:
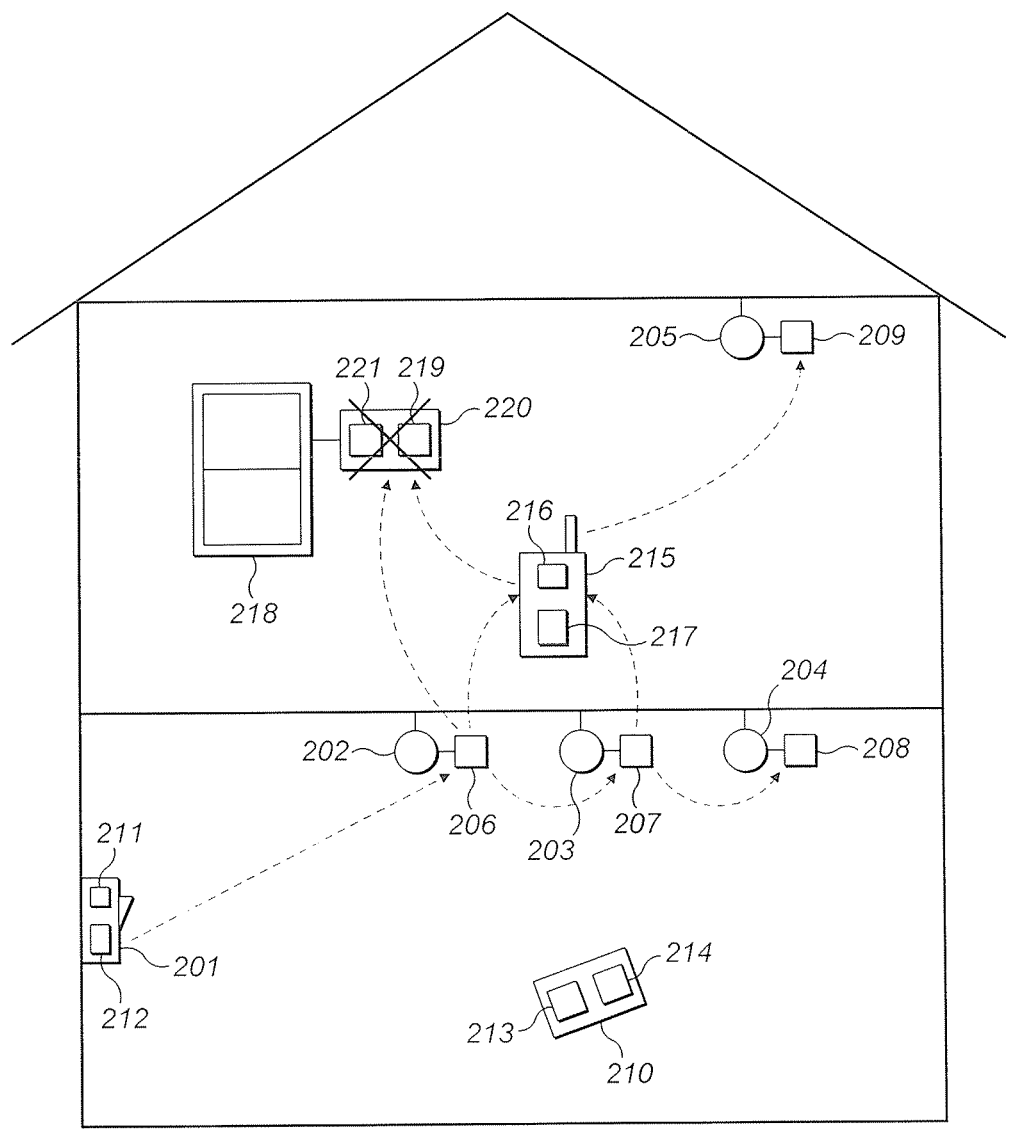

In FIG. 3b, which shows the an embodiment of distributed lighting system of FIG. 2, where like reference numerals refer to like parts, device 219 has shortened its listening periods so that it only listens for half the time. The network is unaffected, however, as the packet from light switch 201 is still relayed by device 216. The alternative arrangement is also possible, with device 219 listening and relaying packets instead of device 216.

The time that a communication device saves by not listening for packets may be spent performing other functions or in a low power mode to conserve battery life. The gaps between the device's listening windows are suitably filled by other devices within radio range so that the performance of the network as a whole does not suffer. In fact, the performance of the network may improve as a consequence of fewer devices relaying the same packet. In addition, since battery powered devices have not traditionally been used as relay devices because of the power implications, networks may find a greater number of devices are capable and willing to operate as relays, at least some of the time, if the requirement for relay devices to listen continuously is relaxed. Devices within range of each other may coordinate their listening periods so at least one of them is listening at all times. A preferred alternative is for the devices to be asynchronous so that largely continuous listening is achieved naturally due to random offsets between the device's own listening periods.

Figure 4:
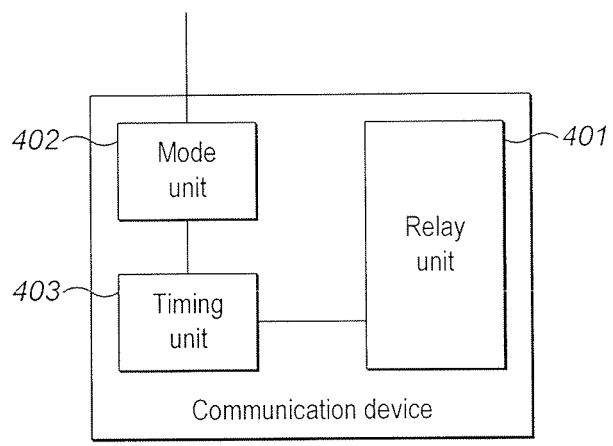
FIG. 4 illustrates a communication device.

A general example of a communication device is shown in FIG. 4. The communication device is capable of acting as a relay device in a mesh network. In most examples the communication device will be configured for wireless communication over the mesh network, although wired configurations are also possible.

The device comprises a relay unit 401, a mode unit 402 and a timing unit 403. The relay unit may be configured to listen for packets. Typically those packets will be intended for one or more other devices in the network. The data content of the packets is thus immaterial to the communication device; its role is just to relay those packets by retransmitting them. The relay unit preferably either has access to a communication unit or incorporates a communication unit (not shown) so that it sees packets that have been received by the communication unit and can control those packets being retransmitted by the device. The mode unit may be configured to identify whether the device's associated consumer has an "active" or a "passive" role in the network, i.e. whether it is waiting for a packet that will cause it to adapt its behaviour. This identification may only have to be performed once, e.g. at switch-on, as many consumer devices will be of a type that means that they are inherently either active or non-active, and that will not change. This "waiting" does not require the consumer to be positively anticipating a packet; it just refers to a state in which the consumer is configured to listen for a packet that might cause it to perform some operation (no matter how insignificant that operation might be). The mode unit may be configured to determine the role of its associated consumer in the network based from information received from that consumer (over a wired or wireless connection). The timing unit may be configured to control the amount of time that the relay unit listens for packets in dependence on the number of the other devices that are identified by the sense unit. This might involve adjusting the length and/or frequency of the device's listening windows. The relay unit may cause circuitry in the communication unit to shut down or enter a sleep mode when it is not listening for packets.

The timing unit may be configured to control the relay unit to listen for longer if the consumer device is active than if it is non-active. In some implementations the timing unit preferably controls the relay unit to listen for the maximum time possible when the communication device's associated consumer is active. In practice this means that the communication device will listen continuously except for: (i) when listening is impossible due to another operation that takes precedence over listening, e.g. transmitting a packet to be relayed; or (ii) during any small gaps in the listening windows that may be permitted by the protocol, e.g. to able the device to switch from listening to one channel to another. This arrangement may be best suited to implementations in which each packet is only transmitted once (although that single transmission might be over multiple channels). If each packet is transmitted multiple times, even an active device might be able to reduce its listening time below the maximum time available without dropping packets that would have adjusted the behaviour of the consumer. Furthermore, it is not always problematic even if some packets are dropped. For example, it is not necessarily essential for all of a room temperature monitor's readings to be received by a central heating control system providing that a minimum level of service is maintained. A timing unit for an active device might therefore control the timing unit to listen for an amount of time in dependence on: (i) a transmit schedule implemented by the network; and/or (ii) a minimally acceptable quality of service.

If a communication device's associated consumer is non-active, the timing unit preferably reduces the amount of time that the communication device spends listening for packets to less than the time it would spend listening if its associated consumer were active. The timing unit, for example, might reduce listening time so that the device is listening less than 20% of the time, less than 10% of the time or even less than 5% of the time. In one specific example, it was been found that a mesh network that transmitted each packet 19 times across three channels, still transported packets reliably with each relay device listening for less than 3% of the time, providing that each of those relays could hear between 10 and 20 others. This compares with the active case, in which the timing unit might typically reduce listening to around 50% of the time, transmit schedule and quality of service permitting. The difference is due to the status of the consumer: an active device wants to minimise dropped packets whereas a non-active device does not particularly care if it drops packets or not since is stateless with respect to them.

The structures shown in FIG. 4 (and indeed all block apparatus diagrams included herein) are intended to correspond to a number of functional blocks in an apparatus. This is for illustrative purposes only. FIG. 4 is not intended to define a strict division between different parts of hardware on a chip or between different programs, procedures or functions in software. In some embodiments, some or all of the algorithms described herein may be performed wholly or partly in hardware. In many implementations, at least part of the relay unit, sense unit and timing unit may be implemented by a processor acting under software control (e.g. the CPU of a communication device). Any such software is preferably stored on a non-transient computer readable medium, such as a memory (RAM, cache, hard disk, etc.) or other storage means (USB stick, CD, disk, etc.).

Figure 5:
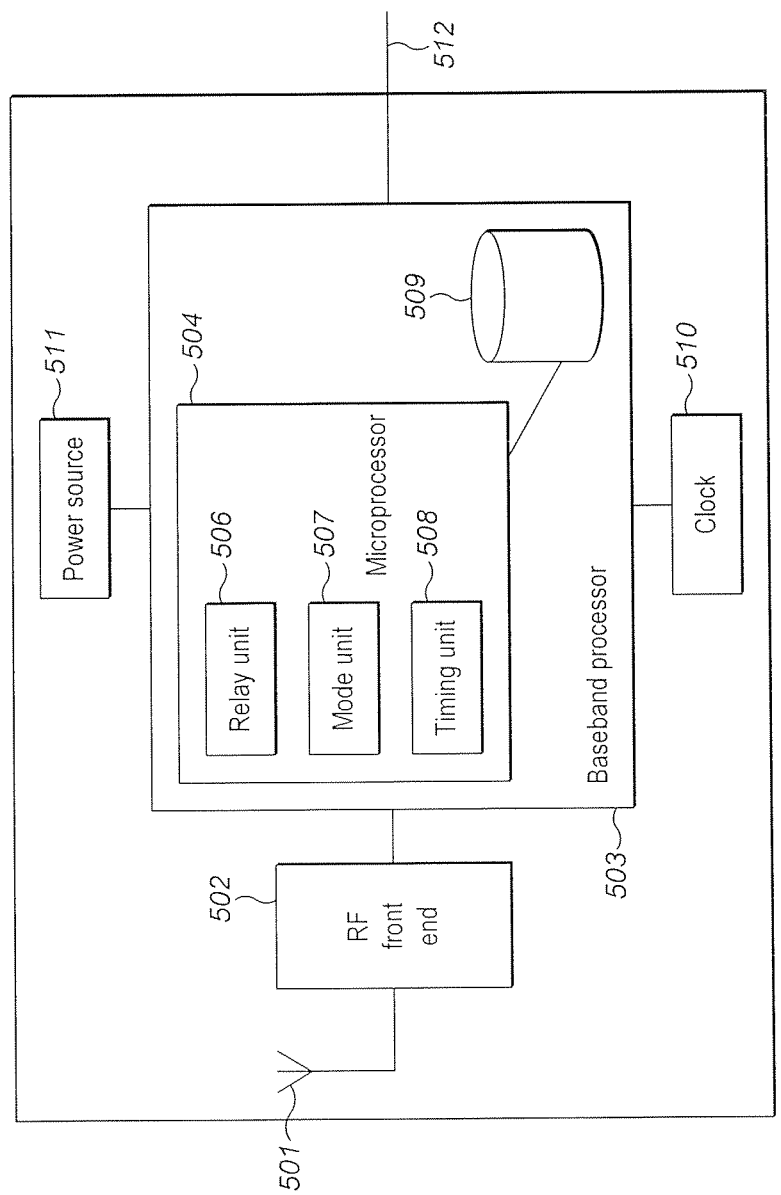
FIG. 5 illustrates a wireless communication device.

Another example of a communication device is shown in FIG. 5. In this example the communication device is configured for wireless communication. The device of FIG. 5 comprises an antenna 501, a radio frequency front end 502 and a baseband processor 503. The baseband processor comprises a microprocessor 504 and a non-volatile memory 509. The non-volatile memory 509 stores in non-transitory form program code that is executable by the microprocessor to cause the baseband processor to implement the communication protocol of the network. In this example the non-volatile memory 509 stores in non-transitory form program code that is executable by the microprocessor to implement the relay unit 506, the mode unit 507, and the timing unit 508.

The device also comprises a clock 510, which can be turned on or off by the microprocessor 504 in order to save power, and an external wired connection 512 for exchanging information with the device's associated consumer. This information may include the sensing external events (e.g. the operation of an associated user interface device such as a switch) or issuing control signals to associated appliances (e.g. light fittings). The device also comprises a power source 511, which may be a battery. The device may also be mains-powered.

The RF front end 502 and the baseband processor could be implemented on one or more integrated circuits.

The term "mesh device" may be used to refer to a communication device and its associated consumer. The communication device in this implementation is configured to operate in accordance with a protocol that governs the mesh network. Commonly the communication device will be a mesh chip incorporated within the consumer. Multiple mesh devices may be arranged in to form an ad-hoc network. Each of the devices may form a node of the network and be responsible for listening for broadcasts from other devices and relaying that information if it is new and not expired. In most cases this will not be the only functional purpose of a mesh device, which is likely to encompass a wide range of devices from smartphones and laptops through to domestic appliances and sensors. Preferably the mesh network is based on a protocol that already exists for non-mesh networks. An advantage of this approach is that an existing protocol is likely to already be implemented by many devices, making it easier to achieve networks having a sufficient device density to implement packet transport through flood routing.

A mesh device may fall into one of two categories:

Mesh Active Device (MAD): Devices whose functional purpose includes obeying mesh commands and thus is required to receive all MESH packets to perform this function.

Mesh Passive Transport (MPT): Devices whose primary purpose in the network is to implement a mesh transport. They will listen for mesh packets and forward new information. They can additionally offer other services (and commonly will since the consumer at least usually has at least one functional purpose other than communicating over a mesh network). They are, however, not required to receive to all mesh packets to perform this function.

An MAD is typically constrained in its scheduling as it is important for the effective realisation of its function that it receive all commands addressed to it. This implies that an MAD has to spend significant amount of time listening for potential commands. It is generally not advisable to attempt to reduce this listening time, although some reduction may be achieved within the constraints described above. Practically, this is often a moot point, however, as the MAD will usually be associated with some actuator, which implies access to an inexhaustible or rechargeable power source and thus removes the requirement for power saving.

An MPT is essentially stateless nature with respect to the transmitted packets. It does not affect the behaviour of an individual MPT if it has not observed a particular packet. This makes it possible for an MPT to have shorter and/or less frequent listening "windows" if there are sufficient other MPTs in the system to compensate. The gaps in listening time created at each single device are filled by the presence of other devices. This may be achieved by synchronisation or time scheduling between the mesh participants. A preferred approach, which requires significantly less setup, is to base the mesh network on an asynchronous protocol such as Bluetooth Low Energy (BLE).

Some examples of a communication device and a method for operating the same will now be described with specific reference to a mesh network that is based on BLE and in which data is broadcast over the mesh network using the three BLE advertising channels. This is for the purposes of example only, and it should be understood that the principles described herein may be implemented using any suitable communication protocol. For example, another possibility is for the network to be based on the Universal Datagram Protocol (UDP) and for it to broadcast packets to the IPv4 or IPv6 multicast address.

Suitably an MAD listens continuously for packets when possible. An example is illustrated in FIGS. 6a and 6b for a mesh network that communicates using the three advertising channels specified by the BLE protocol. In FIG. 6a the MPT scans successively on BLE advertising channels 37, 38, and 39 until it receives some new information. FIGS. 6a and 6b show one transmission over the network. A packet may also be relayed by retransmitting it multiple times over each of the relevant channels. Gaps between transitions from channel to channel are significantly shorter than the receive durations. Gaps between channels or between transmission groups may consist of a random element added to a fixed (minimum) duration to increase non-synchronisation with other beacons. The listening process is repeated until data is detected. If the data is considered to be a mesh packet that is valid and new (i.e. so that it is a packet for relaying), the receive operation is stopped for an immediate forwarding of the packet on all three channels. If the mesh packet is not for relaying, reception continues for its expected duration. Once the data has been transmitted, the standard schedule is realigned to what it would have been if it had not been interrupted. Resuming the same schedule may be important to avoid devices accidentally synchronising after a relay operation. In FIG. 6b, a similar operation is followed but the device additionally performs a non-mesh transmit for additional function delivery. This non-mesh transmit and the relay transmit represent times when it is impossible for most current devices to listen. Thus, while the device tries to listen continuously, in practice this is not realisable so the device simply listens for as long as possible.

Figure 7:
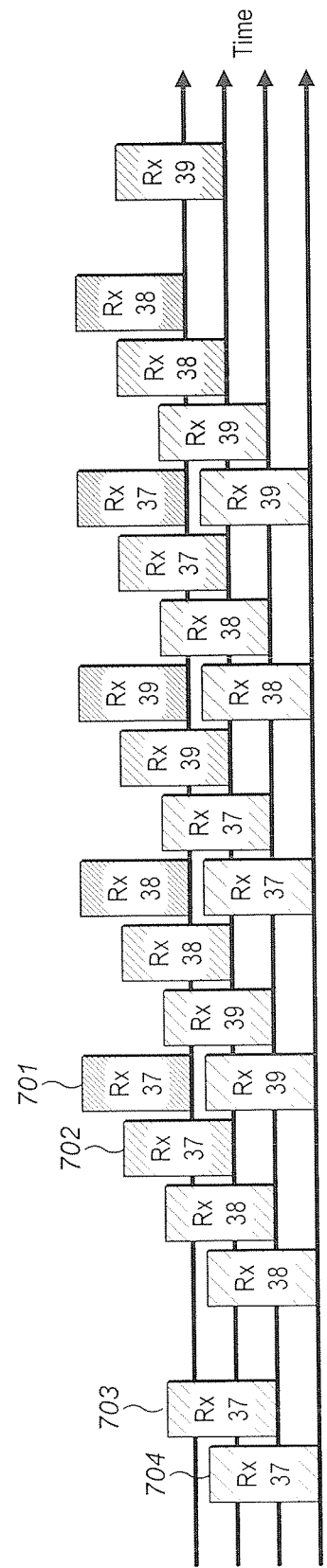
FIG. 7 illustrates another option for acting as a relay in a Bluetooth Low Energy (BLE) mesh network.

An alternative implementation is shown in FIG. 7. FIG. 7 shows the listening windows of four different MPTs. In this implementation devices 701, 702, 703 and 704 have all reduced their listening windows. The overall effect on transport in the network is negligible, however, since the times when one device is not listening are filled by another device. Thus it is possible to trade receiving time (and packet drop by individual devices) against an increase in the number of listening devices. Receive windows for individual devices are reduced, and compensated by the density of devices in the mesh.

A device may have, as a default mode, a mode of operation in which it listens continuously for packets when possible (e.g. at any time when it is not engaged in another operation, such as transmitting, which renders it difficult for it to listen). The device may various pieces of information into account when deciding whether to reduce the time for which it listens to packets in order to save power, including:

The current operating mode of its associated consumer.

Its power status.

Information or commands received from the network.

An acceptable quality of service (e.g. a temperature monitor that is configured to collect an acceptable minimum of temperature packets from a temperature sensor).

A transmit schedule implemented by other devices in the network.

The device may identify the operating mode of its associated consumer in dependence on information received from that consumer. The consumer might, for example, provide the device with a code or setting at switch-on that informs the communication device what type of consumer it is associated with, e.g. a light bulb that is expected to listen to all commands directed to it. This might form part of the configuration at installation. In another implementation the consumer might be of a type that could be active or non-active, depending on circumstance. A consumer of this type might be configured to provide the device with an update whenever its mode changes from active to non-active, and vice versa. A practical example might be a light fitting with a small backup battery as part of a security/fire alarm system. During a power cut, the light fitting could switch from active to inactive to conserve the battery because it will either not turn the light on at all until mains power is restored or will remain on in a reduced power mode only as an escape light until mains power is restored. The light fitting (or more accurately its associated consumer device) should still relay mesh messages as part of the security/fire alarm system, however. The device might equally be pre-programmed for inclusion in either an active device or a non-active device. This limits the exchange of information that needs to take place between the device and its associated consumer but would limit the range of consumers that the device could be associated with. The communication device might also be configured to receive information from its associated consumer about other relevant factors, such as a minimally acceptable quality of service for example.

The device might also take its power status into account. For example, whether it has access to mains power or not and, it is battery powered, the amount of power the battery has left.

Another option is for the device to take information or commands received from the network into account when determining its listening schedule. For example, it can be envisaged that in some situations there might be an insufficient density of devices for all non-active devices to substantially reduce their listening time. Therefore, if one device (e.g. a controller) determines that packets are taking too long to reach their destination or are being regularly dropped, it may send out an instruction for all devices to increase their listening time. A device may consider its own power status before deciding whether or not to accede to such a request.

Figure 8:
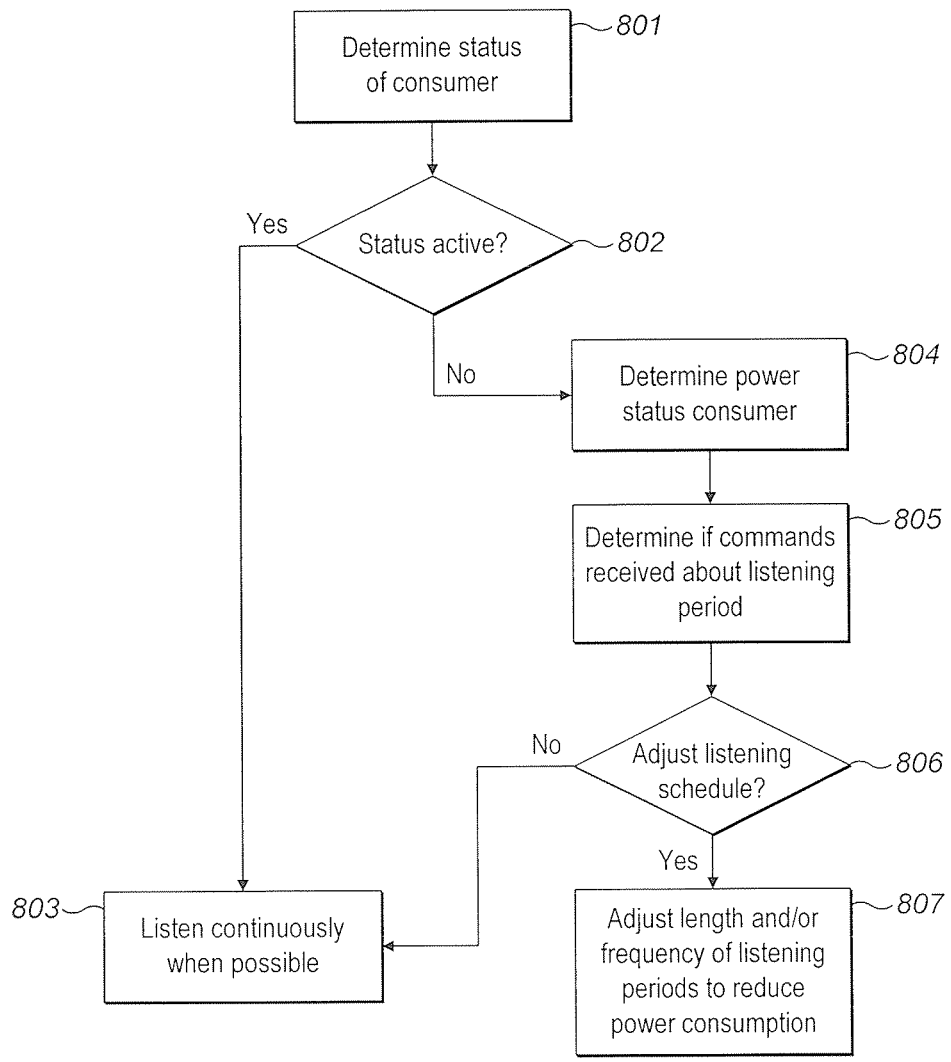
FIG. 8 illustrates an example of a method for operating a communication device.

An example of a method that might be performed by a communication device is shown in FIG. 8. In step 801 the device ascertains the status of its associated consumer. If that status is active (step 802), the device determines that it should listen continuously (step 803). If the consumer's status is not active, the device may determine its own power status (step 804) and whether any commands have been received from the network concerning listening periods (step 805) before deciding to adjust its listening schedule (step 806). The device may then adjust the length and/or frequency of its listening windows (step 807), thus reducing power consumption.

In one implementation, the network is asynchronous. Under this arrangement two devices will usually not transmit or receive at the same time. In BLE this non-synchronisation has two causes: a natural non-synchronisation due to the high clock jitter permitted when using the advertising channels and an imposed de-synchronisation caused by introducing a pseudo-random delay to the start time of each advertising event.

Natural jitter of the clock and any pseudo-random delay that is implemented independently by a device imply that receive windows will naturally slide with respect to each other from one communication device to another. Thus the listening windows of different communication devices will inevitably end up commencing and finishing at different times even without any explicit coordination between those devices. BLE also allows for elective random jitter in a first transmission. Thus the timing of packet reception is also unpredictable and subject to variation. It is also possible to increase non-synchronisation by adding random gaps between receive windows. The result is a highly beneficial for environment for an ad hoc mesh network since the devices will naturally tend to listen at different times from each other so that, given a sufficient density of mesh devices, there will usually be at least one device listening at any given time.

An asynchronous implementation thus is able to achieve reduced power consumption for relay devices, thus permitting a battery based deployment, reducing cost, increasing active life and reducing deployment cost, since no infrastructure is required to implement the time-sharing of listening duties.

The principles described herein enable a network to transfer packets via a stochastic transport mechanism. This technique is well suited to ad hoc networks. The network is able to achieve reliable transport between two arbitrary devices via intermediary devices, which are not expected to handle communications reliably, because there is a sufficient density of devices in the network to compensate for devices that have reduced their receive power. Relaxing the constraint on the reliability of an individual device permits better power management, opening up the network to a wider range of devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A communication device for communicating over a mesh network on behalf of a consumer device, the communication device comprising:
   one or more processors;
   a memory storing instructions that, when executed by the one or more processors, cause the communications device to:
   determine a first time interval that the communication device spends listening for packets when the consumer device is identified as an active device configured to respond to commands received from the mesh network; and
   determine a second time interval, less than the first time interval, that the communication device spends listening for packets when the consumer device is identified as a non-active device not configured to respond to commands received from the mesh network.

2. The communication device of claim 1, wherein execution of the instructions to determine the second time interval causes the communications device to adjust a length of a window during which the communication device listens continuously for packets.

3. The communication device of claim 1, wherein execution of the instructions to determine the second time interval causes the communications device to adjust a time interval between windows during which the communication device listens continuously for packets.

4. The communication device of claim 1, wherein execution of the instructions to determine the second time interval causes the communications device to determine a power status of the communication device, wherein the second time interval is based on the power status of the communication device.

5. The communication device of claim 1, wherein the mesh network operates according to an asynchronous protocol, and the communication device listens for packets asynchronously from one or more other communication devices in the mesh network.

6. The communication device of claim 1, wherein execution of the instructions to determine the second time interval causes the communications device to insert a time interval of random duration between each window during which the communication device listens continuously for packets.

7. The communication device of claim 1, wherein the communications device identifies whether the consumer device is an active device or a non-active device based on information received from the consumer device.

8. The communication device of claim 1, wherein the consumer device is identified as an active device or a non-active device based on whether the consumer device is configured to receive a packet that will cause the consumer device to perform an operation.

9. The communication device of claim 1, wherein execution of the instructions to determine the second time interval causes the communication device to adjust a length of a window during which the communication device listens continuously for packets based on whether one or more other communication devices in the mesh network are listening for packets.

10. A method of communication over a mesh network, the method performed by a communications device on behalf of a consumer device and comprising:
    determining a first time interval that the communication device spends listening for packets when the consumer device is identified as an active device configured to respond to commands received from the mesh network; and
    determining a second time interval, less than the first time interval, that the communication device spends listening for packets when the consumer device is identified as a non-active device not configured to respond to commands from the mesh network.

11. The method of claim 10, wherein determining the second time interval comprises adjusting a length of a window during which the communication device listens continuously for packets.

12. The method of claim 10, wherein determining the second time interval comprises adjusting a time interval between windows during which the communication device listens continuously for packets.

13. The method of claim 10, wherein determining the second time interval comprises determining a power status of the communication device, wherein the second time interval is based on the power status of the communication device.

14. The method of claim 10, wherein the mesh network operates according to an asynchronous protocol, and the communication device listens for packets asynchronously from one or more other communication devices in the mesh network.

15. The method of claim 10, wherein determining the second time interval comprises inserting a time interval of random duration between each window during which the communication device listens continuously for packets.

16. The method of claim 10, wherein determining the second time interval comprises adjusting a length of a window during which the communication device listens continuously for packets based on whether one or more other communication devices in the mesh network are listening for packets.

17. A non-transitory computer-readable storage medium storing instructions that, when executed by a processor of a communication device associated with a consumer device in a mesh network, causes the communication device to:
    determine a first time interval that the communication device spends listening for packets when the consumer device is identified as an active device configured to respond to commands received from the mesh network; and
    determine a second time interval, less than the first time interval, that the communication device spends listening for packets when the consumer device is identified as a non-active device not configured to respond to commands received from the mesh network.

18. The non-transitory computer-readable storage medium of claim 17, wherein execution of the instructions to determine the second time interval causes the communications device to adjust a length of a window during which the communication device listens continuously for packets.

19. The non-transitory computer-readable storage medium of claim 17, wherein execution of the instructions to determine the second time interval causes the communications device to adjust a time interval between windows during which the communication device listens continuously for packets.

20. The non-transitory computer-readable storage medium of claim 17, wherein execution of the instructions to determine the second time interval causes the communications device to insert a time interval of random duration between each window during which the communication device listens continuously for packets.

* * * * *